US009681464B2

(12) United States Patent
Chou

(10) Patent No.: US 9,681,464 B2
(45) Date of Patent: Jun. 13, 2017

(54) COOPERATIVE TRANSMISSION WITHIN HETEROGENEOUS STATIONS

(75) Inventor: Chie-Ming Chou, Qingshui Town (TW)

(73) Assignee: Industrial Technology Research Institute, Hsinchu (TW)

( * ) Notice: Subject to any disclaimer, the term of this patent is extended or adjusted under 35 U.S.C. 154(b) by 593 days.

(21) Appl. No.: 12/877,891

(22) Filed: Sep. 8, 2010

(65) Prior Publication Data
US 2011/0070907 A1 Mar. 24, 2011

(51) Int. Cl.
H04W 72/12 (2009.01)
H04B 7/022 (2017.01)
H04L 12/851 (2013.01)
H04W 8/00 (2009.01)
H04W 52/40 (2009.01)
H04W 84/04 (2009.01)

(52) U.S. Cl.
CPC ........ *H04W 72/1242* (2013.01); *H04B 7/022* (2013.01); *H04L 47/2433* (2013.01); *H04W 72/1247* (2013.01); *H04W 8/005* (2013.01); *H04W 52/40* (2013.01); *H04W 84/045* (2013.01); *H04W 84/047* (2013.01)

(58) Field of Classification Search
CPC . H04W 52/40; H04W 8/005; H04W 72/1242; H04W 72/1247; H04W 84/045; H04W 84/047; H04B 7/022; H04L 47/2433
USPC ....................... 455/435.2–444, 450; 370/331
See application file for complete search history.

(56) References Cited

U.S. PATENT DOCUMENTS

| 6,611,688 | B1* | 8/2003 | Raith ...................... H04W 4/02 340/992 |
| 7,596,120 | B2* | 9/2009 | Kim et al. .................... 370/331 |
| 8,023,950 | B2* | 9/2011 | Malladi ................. H04L 1/0007 370/328 |
| 8,185,060 | B2* | 5/2012 | Agashe et al. .................. 455/69 |
| 2003/0053519 | A1* | 3/2003 | Gilhousen et al. ........... 375/141 |
| 2003/0061369 | A1* | 3/2003 | Aksu et al. ................... 709/231 |
| 2006/0141929 | A1 | 6/2006 | Lockie et al. |
| 2008/0153497 | A1* | 6/2008 | Kalhan ......................... 455/436 |
| 2009/0080375 | A1 | 3/2009 | Jalil et al. |

(Continued)

FOREIGN PATENT DOCUMENTS

CN 1407822 A 4/2003
CN 101179503 A 5/2008

(Continued)

OTHER PUBLICATIONS

*Autonomous CC selection for heterogeneous environments*, 3GPP TSG RAN WG1 #59 Meeting, R1-094659, Nov. 9-13, 2009.

(Continued)

*Primary Examiner* — Raymond Dean
(74) *Attorney, Agent, or Firm* — Alston & Bird LLP

(57) ABSTRACT

A method for transmitting data in a wireless network comprises categorizing the data into at least two categories, each category being associated with a respective priority, directing the categorized data to a first base station and a second base station according to the respective priorities and respective access characteristics of each base station and transmitting the categorized data from the first base station and the second base station to a mobile station via associated bands.

22 Claims, 6 Drawing Sheets

(56) References Cited

U.S. PATENT DOCUMENTS

2009/0168701 A1* 7/2009 White et al. ............... 370/328
2009/0196174 A1   8/2009 Ji
2010/0254346 A1* 10/2010 Jain et al. ................. 370/331

FOREIGN PATENT DOCUMENTS

CN       101505182 A    8/2009
WO  WO 2010/078598 A2   7/2010

OTHER PUBLICATIONS

Office Action for Chinese Application No. 201010287524.5 dated Aug. 31, 2012.
Office Action for Chinese Application No. 201010287524.5 dated May 15, 2013.

* cited by examiner

COOPERATIVE TRANSMISSION WITHIN HETEROGENEOUS STATIONS

CROSS-REFERENCE TO RELATED APPLICATION

This application claims the benefit of U.S. Provisional Application No. 61/243,812, filed Sep. 18, 2009, the content of which is hereby incorporated by reference in its entirety.

TECHNICAL FIELD

Exemplary embodiments relate to communication with base stations of heterogeneous networks.

BACKGROUND

With the development of broadband wireless access technology, end users may access a heterogeneous network by different access technologies to meet the requirements of different applications. A heterogeneous network may include a mix of high performance capabilities of large-scale base stations (e.g., macro base stations) with lowpowered base stations (e.g., micro base stations, pico base stations, femto base stations and relay base stations) that work to complement the performance of the large-scale base stations. The base stations may be categorized based on transmission powers, access characteristics or the like. For example, a macro base station may provide good coverage with higher transmit power, while a relay base station may allow for higher data rates with lower transmit power.

Performance of applications may be determined by a number of factors, such as bandwidth, latency, throughput, reliability, robustness or the like. For example, multimedia applications such as voice over IP (VoIP) and online games may require a sustained bandwidth with minimum latency. Data applications, on the other hand, may require high total throughput but are latency tolerant. In this regard, it is desirable to improve data transmissions based on the requirements of applications, thereby significantly increasing the capacity of wireless networks and facilitate better quality of service for end users.

BRIEF SUMMARY

According to one exemplary embodiment of the subject disclosure, a method for transmitting data in a wireless network comprises categorizing the data into at least two categories, each category being associated with a respective priority, directing the categorized data to at least two base stations according to the respective priorities and respective access characteristics of each base station, and transmitting the categorized data from the at least two base stations to a mobile station via associated bands.

According to one exemplary embodiment of the subject disclosure, an apparatus for transmitting data according to traffic priorities in a wireless communication system comprises a processor configured to perform or cause the apparatus to perform categorizing the data into at least two categories, each category being associated with a respective priority, directing the categorized data to at least two base stations according to the respective priorities and respective access characteristics of each base station, and transmitting the categorized data from the at least two base stations to a mobile station via associated bands According to one exemplary embodiment of the subject disclosure, a method for transmitting data in a wireless network comprises discovering an existence of a neighboring base station, analyzing access characteristics of the discovered a neighboring base station, categorizing the data into at least two categories, each category being associated with a respective priority, scheduling the categorized data according to the respective priorities, identifying the categorized, scheduled data that are suitable to be transmitted by the discovered neighboring base station, and directing transmission of the identified, scheduled, categorized data from the neighboring base station to a mobile station according to the access characteristics.

BRIEF DESCRIPTION OF THE DRAWINGS

The embodiments illustrated in the figures of the accompanying drawings herein are by way of example and not by way of limitation. In the drawings.

DETAILED DESCRIPTION

The subject disclosure now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In this regard, reference may be made herein to a number of mathematical or numerical expressions or values, and to a number of positions of various components, elements or the like. It should be understood, however, that these expressions, values, positions or the like may refer to absolute or approximate expressions, values or positions, such that exemplary embodiments may account for variations that may occur in the multi-channel optical cell, such as those due to engineering tolerances. Like numbers refer to like elements throughout.

As used herein, the terms "signals," "packets," "data packets," "streams," "application data," "traffic data," "data traffic" and the like may refer to data that is transmitted from or received by a base station and is partially or completely contained in a transport block that is delivered from physical layer to MAC layer.

Additionally, the word "exemplary" is used herein to refer to serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1:
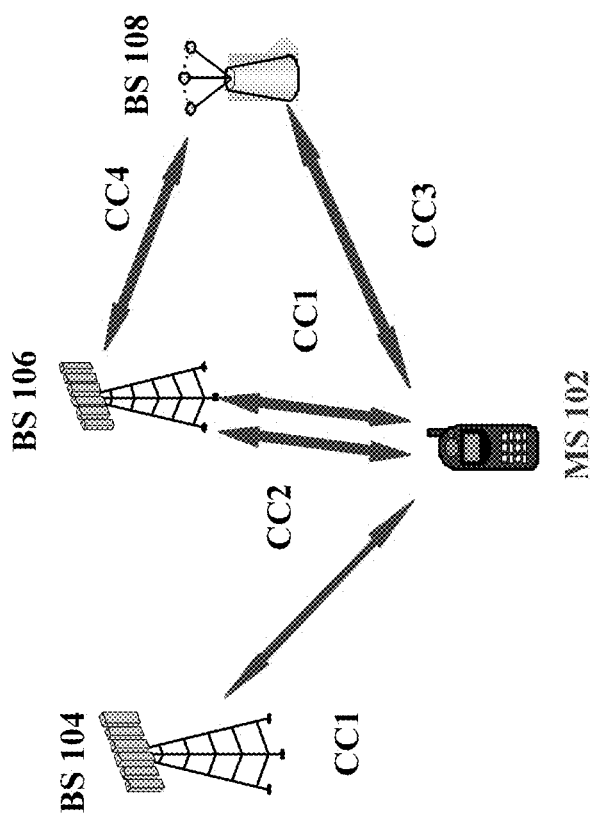
FIG. 1 is a schematic block diagram illustrating components of an exemplary system, in accordance with exemplary embodiments.

FIG. 1 is a schematic block diagram illustrating components of an exemplary system for implementing exemplary embodiments. The system may include one or more wireless communication networks. For example, embodiments may be at least partially implemented in any of a number of radio access networks including any 2G, 3G, 4G or intervening or higher generation mobile communication network and their different versions, radio frequency (RF) or any of a number of different wireless networks, as well as to any other wireless radio access network that may be arranged to interwork with such networks. More particular examples of suitable networks may include 3GPP radio access networks, Universal Mobile Telephone System (UMTS) radio access UTRAN (Universal Terrestrial Radio Access Network), Global System for Mobile Communications (GSM) radio access networks, code division multiple access (CDMA), CDMA 2000, radio access networks, time division multiple access (TDMA), frequency division multiple access (FDMA), orthogonal FDMA (OFDMA), single-carrier FDMA (SC-FDMA), multi-carrier FDMA (MC-FDMA), multi-carrier CDMA (MC-CDMA), wireless local area networks (WLANs) such as IEEE 802.xx networks (e.g., 802.11a, 802.11b, 802.11g, 802.11n, etc.), World Interoperability for Microwave Access (WiMAX) networks, IEEE 802.16e, IEEE802.16j, IEEE 802.16m and/or wireless personal area networks (WPANs) such as IEEE 802.15, Bluetooth, low power versions of Bluetooth, infrared (IrDA), ultra wideband (UWB), Wibree, Zigbee or the like. 3GPP radio access networks may include, for example, 3G (e.g., GERAN) or 3.9G (e.g., UTRAN Long Term Evolution (LTE). Long Term Evolution Advanced (LTE-A) or Super 3G) or E-UTRAN (Evolved UTRAN) networks and the like. As shown, system may include one or more mobile stations (MS) 102 (or terminals, user equipment, etc.) configured to communicate within and/or across the network(s). The network(s) may include one or more infrastructure components such as base stations (BSs) (three being shown as BS 104, 106, 108), base station controllers (BSC), evolved node B (eNB), mobile switching centers (MSC), access points (AP) (e.g., gateways) and the like. The BS may be configured to communicate with the MS 102 to transmit and receive voice and data information via the network(s). Although a specific numbers of BSs and MSs are shown, FIG. 1 is exemplary and any numbers of BSs and MSs may be provided. Furthermore, the functions provided by one or more devices of system may be combined, substituted, or re-allocated among various devices.

As explained further below, each BS 104, 106, 108 may include any appropriate apparatus or system that facilitates communication between a MS and a network. For example, in some embodiments, the BS may include a wireless communication device installed at a fixed location to create a cell or defined geographic region of network coverage, such as a node B or eNB, a base transceiver station (BTS), an access point, a home BS, etc. In other example embodiments, the BS may be a relay station, an intermediate node, or an intermediary. More particularly, according to one exemplary embodiment, the BS may be a macro BS (macro BS), a micro BS (micro BS), a pico BS (PBS), a relay BS (RBS) or the like. The BS may include any appropriate type of wireless or radio BS, such as a land-based communication BS or a satellite-based communication BS. The BS may include any appropriate type voice, data, and/or integrated voice and data communication equipment to provide high speed data and/or voice communications. In other example embodiments, any other type of BS or equivalent thereof may be used.

The MSs 102 may be any type of device for communicating with a BS 104, 106, 108. For example, a MS may be a mobile communication device, or any other appropriate computing platform or device capable of exchanging data and/or voice information with BS such as servers, clients, desktop computers, laptop computers, network computers, workstations, personal digital assistants (PDA), tablet PCs, scanners, telephony devices, pagers, cameras, musical devices, etc. A MS may be a fixed computing device operating in a mobile environment, such as, for example, a bus, a train, an airplane, a boat, a car, etc. In some embodiments, a MS may be configured to communicate with the BS using any of the various communication standards supporting mobile communication devices. The MSs may be configured to communicate with other MSs (not shown) directly or indirectly via BS or other BSs or computing systems (not shown) using wired or wireless communication methods.

Figure 2:
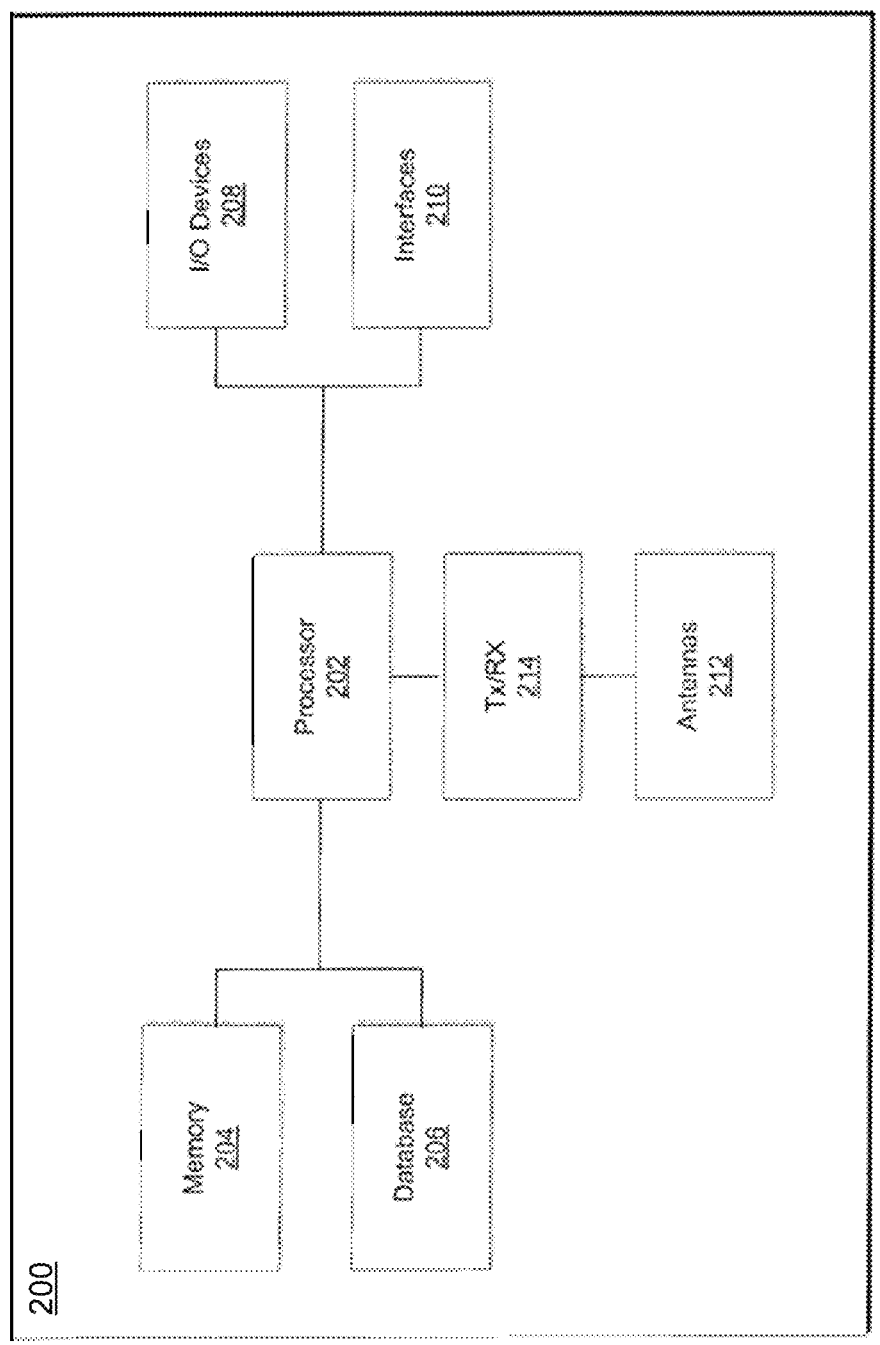
FIG. 2 is a schematic block diagram of an apparatus configured to operate as a mobile station, base station or other network infrastructure component, in accordance with exemplary embodiments.

FIG. 2 illustrates a block diagram of an apparatus 200 that may be configured to operate as a MS 102, BS 104, 106, 108 or other network infrastructure component, in accordance with exemplary embodiments. As shown in FIG. 2, apparatus may include one or more of the following components: at least one processor 202 configured to execute computer-readable instructions to perform various processes and methods, memory 204 configured to access and store information and computer readable instructions, database 206 to store tables, lists, or other data structures, I/O devices 208, interfaces 210, antennas 212 and transceivers 214.

The processor 202 may include a general purpose processor, application specific integrated circuit (ASIC), embedded processor, field programmable gate array (FPGA), microcontroller, digital signal processor (DSP) or other like device that may include any suitable combination of the foregoing. The processor may be configured to act upon instructions and data to process data output from transceiver 214, I/O devices 208, interfaces 210 or other components that are coupled to processor. In some exemplary embodiments, the processor may be configured to exchange data or commands with the memory 204. For example, the processor may be configured to receive computer-readable instructions from the memory and perform one or more functions under direction of the respective instructions.

The memory 204 may include a volatile or non-volatile computer-readable storage medium configured to store data as well as software, such as in the form of computer readable instructions. More particularly, for example, the memory may include volatile or non-volatile semiconductor memory devices, magnetic storage, optical storage or the like. The memory may be distributed. That is, portions of the memory may be removable or non-removable. In this regard, other examples of suitable memory include Compact Flash cards (CF cards), Secure Digital cards (SD cards), Multi-Media cards (MMC cards) or Memory Stick cards (MS cards) or the like. In some exemplary embodiments, the memory may be implemented in a network (not shown) configured to communicate with the apparatus 200.

The database 206 may include a structured collection of tables, lists or other data structures. For example, the database may be a database management system (DBMS), a relational database management system, an object-oriented database management system or similar database system. As such, the structure may be organized as a relational database or an object-oriented database. In other exemplary embodiments, the database may be a hardware system including physical computer-readable storage media and input and/or output devices configured to receive and provide access to tables, lists, or other data structures. Further, hardware system database may include one or more processors and/or displays.

The I/O devices 208 include any one or more of a mouse, stylus, keyboard, audio input/output device, imaging device, printing device, display device, sensor, wireless transceiver or other similar device. The I/O devices may also include devices that provide data and instructions to the memory 204 and/or the processor 202.

The interfaces 210 may include external interface ports, such as USB, Ethernet, FireWire®, and wireless communication protocols. The interfaces may also include a graphical user interface, or other humanly perceivable interfaces configured to present data, including but not limited to, a portable media device, traditional mobile phone, smart phone, navigation device, or other computing device. The apparatus 200 may be operatively connected to a network (not shown) via a wired and/or wireless communications link using the interface.

The transceiver 214 may include any appropriate type of transmitter and receiver to transmit and receive voice and/or data from other apparatuses (e.g., MS 102, BS 104, 106, 108). In some exemplary embodiments, the transceiver may include one or a combination of desired functional component(s) and processor(s) to encode/decode, modulate/demodulate and/or perform other wireless communication-channel-related functions. The transceiver may be configured to communicate with an antenna 212 (e.g., single antenna or antenna array) to transmit and receive voice and/or data in one of various transmission modes.

Figure 3:
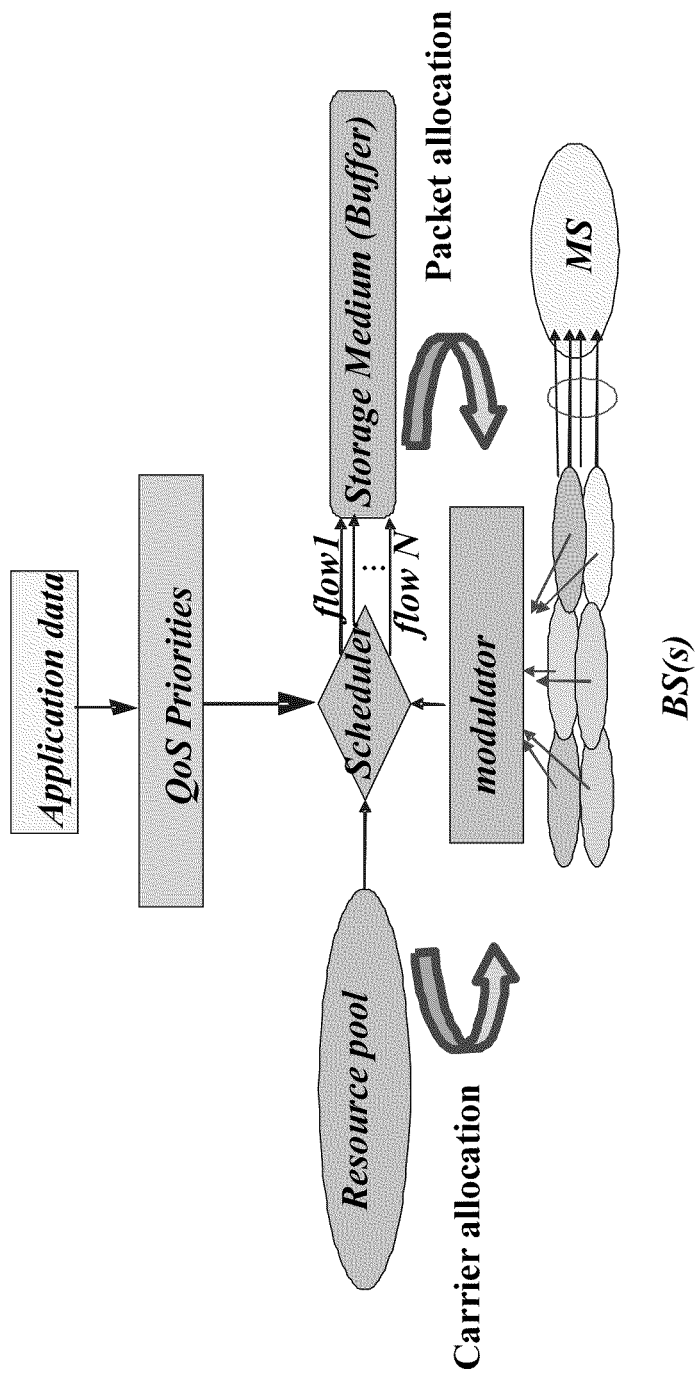
FIG. 3 illustrates a wireless network architecture according to an exemplary embodiment.

FIG. 3 illustrates a wireless network architecture according to an exemplary embodiment. The network architecture defines the protocols and components for satisfying application requirements, and may be implemented at one or more network infrastructure components, such as a BS, BSC, MSC, AP or the like. The architecture illustrated in this exemplary embodiment is the seven-layer Open System Interconnect (OSI) reference model, although the architecture may be in accordance with other similar models such as the TCP/IP model. Various applications at the application layer may include real-time or near-real-time applications (generally real-time applications) and non-real-time applications based on their sensitivity to timing constraints. Real-time applications are known to demand larger amounts of bandwidth and impose stringent timing requirements. The applications that fit into this category may include VoIP, video, audio, games and the like. On the other hand, for non-real-time applications such as control information, Email, HTTP data, and file transfers, timing constraints may not be critical. Accordingly, a number of categories with different priorities may be defined for different applications.

In one exemplary embodiment, application data may be categorized into two or more categories according to qualify of service (QoS) priorities. For example, data may be categorized into control packets and data packets, where a data packet may be considered a payload prepared for transmission, and transmitted, in one physical block. The control packets may be given higher QoS priority than the data packets. Data packets may further be categorized into real-time application data and non-real-time application data. For those data from real-time applications (real-time application data) may be given higher QoS priority compared to non-real-time application data. Once the packets are assigned respective priorities, the categorized and prioritized application data may be scheduled into a buffer by a scheduler based on the priority of respective packet. Packets with higher priority may be put in front of the packets with lower priority in the buffer. Therefore, when the network is congested, lower priority packet(s) may be dropped or otherwise delayed.

The scheduler may also check the availability of the network resources and allocate the resources based on application requirements. For example, the scheduler may assign bandwidth for connections between MSs 102 and BSs 104, 106, 108. The scheduler may also acquire access characteristics of BSs of different types and modulate the scheduled packets to a target BS according to its respective access characteristics. For example, real-time application data may be transmitted by pico BSs because no multi-hop is required in pico BSs. In contrast, relay BSs may be employed to transmit non-real-time application data due to longer delay generated by multi-hop architecture in relay transmissions and higher data transmission rate.

Returning back to FIG. 1, one or more of the network(s) of the system may be configured as heterogeneous networks, which according to exemplary embodiments, may be configured to support cooperative transmissions using carrier aggregation. In this regard, in a typical wireless communication system, a MS may transmit an uplink transmission to a BS via an uplink band, and receive a downlink transmission from the BS via a downlink band. To support a higher data rate in advanced communication systems, however, a wider transmission bandwidth may be required. Carrier aggregation is a technique in which a MS (on the uplink) or BS (on the downlink) contiguously or discontiguously aggregates multiple bands—each of which may be referred to as a component carrier (CC), to meet a particular increased system requirement for uplink or downlink bandwidth.

On the downlink, each component carrier may occupy a scalable bandwidth in which it may carry information and data to a MS. In the exemplary embodiment as illustrated in FIG. 1, four component carriers, CC1, CC2, CC3 and CC4 are used between a MS 102 and a number of BSs 104, 106, 108. The BSs may include a macro BS (macro BS), a micro BS (micro BS), a pico BS (PBS), a relay BS (RBS) or the like. The MS 102 may accordingly simultaneously receive and/or transmit application data on the four component carriers that, depending on its capabilities, may have different frequencies and different bandwidths. According to various access characteristics of each BS, the component carriers may be designated to transmit different signals of different types. In one exemplary embodiment, BS 104 may be a macro BS. For the component carriers, for example, CC1 may be assigned to transmit control signals, including handover control signals, scheduling signals, system information, broadcast information, paging information, configuration information, commands, orders or the like. Since the Macro BS may transmit data at a higher power, it may provide large geographical area coverage to avoid the frequent handover process for a moving MS. The same bandwidth (e.g., CC1) of each of the BS 104 and BS 106 may be used for transmitting the same signals (e.g., the control signals) to the MS 102, which may be accordingly referred as "macro diversity." By macro diversity, the received control signal strength and signal quality may be increased. Macro diversity may also facilitate efficiency of transmissions between the MS 102 and the BSs.

BS 106 in the example embodiment of FIG. 1 may serve to route data between the wired infrastructure devices (e.g., a macro BS or access points) and the MS 102, such as to enhance the quality of end-to-end communication. In this example embodiment, BS 106 may be a PBS that may transmit application data at a smaller power compared to a macro BS 104, thus providing relatively small geographical area coverage. Since the PBS 106 may provide good transmitting quality within limited area, CC2 may be assigned to transmit real-time application data between the PBS 106 and the MS 102. The same bandwidth (i.e., the same CC2) allocated to the BS 104 or the BS 108 may be used for transmitting other types of signals to other MSs or used for transmitting the same types of signals to the MS 102. In some embodiments, CC2 may be left blank in which no transmission takes place.

BS 108 in this exemplary embodiment may serve as a RBS for data to be routed between the BSs (e.g., the PBS 106) and the MS 102. The RBS 108 may receive data packets from a source BS (e.g., the PBS 106) via one component carrier (e.g., CC4), decode the received data packets and forward it to the next hop (e.g., the MS 102) via another component carrier (e.g., CC3) that may occupy a different bandwidth and different frequency than that of CC4. In communication over multiple hops, the allocation of resources may be coordinated by the macro BS 104, the PBS 106 or another network infrastructure component. On one side, the RBS 108 may be an alternative to increasing the density of macro BSs to provide line of sight (LOS), which may accordingly improve coverage and increase throughput. On the other side, data transmission across multiple hops may cause data delivery delay. In this regard, CC3 and CC4 may be appropriate to transmit non-real-time application data that may require high throughput without a latency requirement. The same bandwidth (e.g. CC3) allocated to the BS 104 or the BS 106 may be used for transmitting other types of signals to other MSs or used for transmitting the same types of signals to the MS 102. In one exemplary embodiment, CC3 may be left blank in which no transmission takes place.

Figure 4:
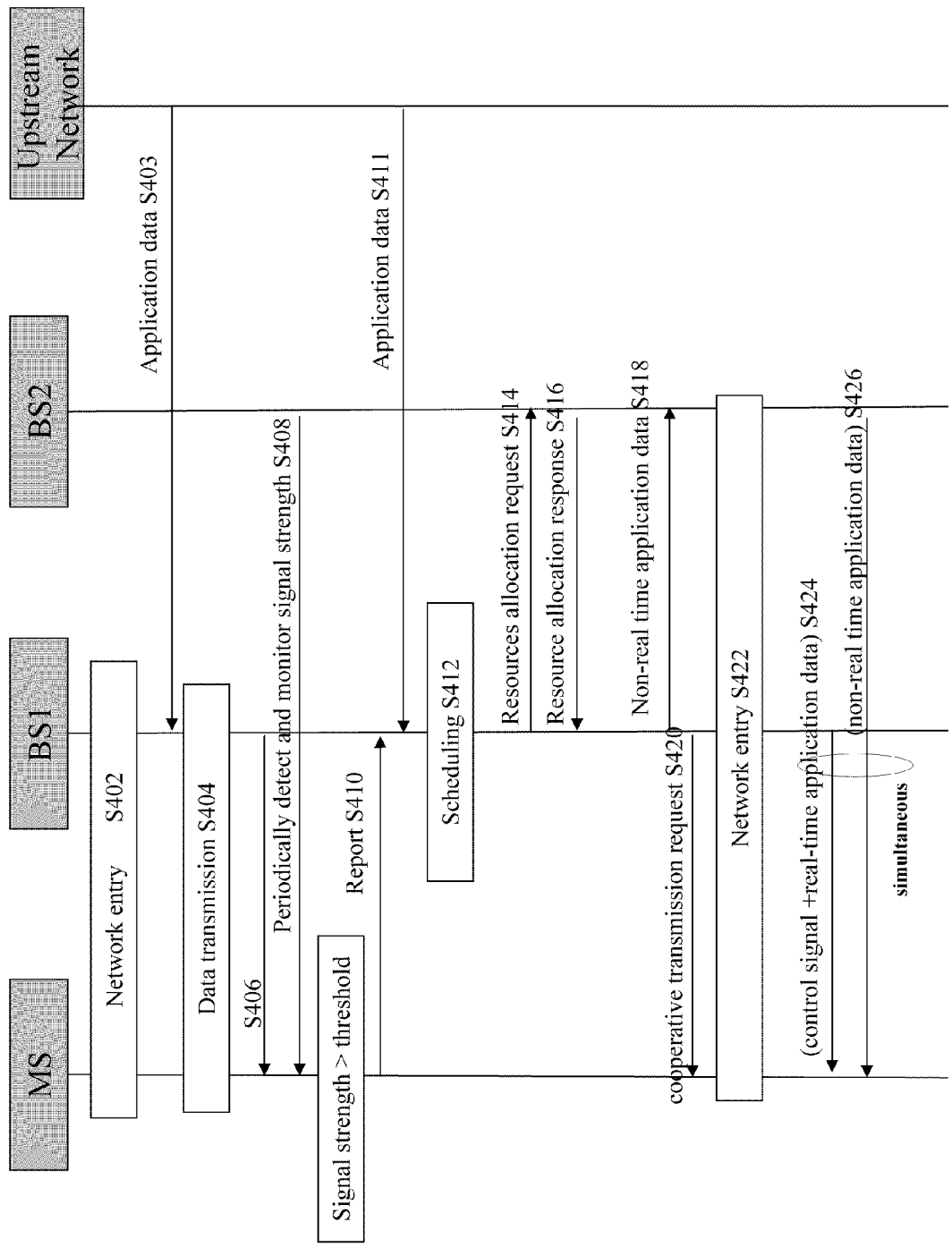
FIGS. 4-6 illustrate a cooperative transmission procedure according to various exemplary embodiments of the disclosure.

FIG. 4 illustrates a cooperative transmission procedure according to one exemplary embodiment of the subject disclosure. At step S402, a MS (e.g., the MS 102) may establish a connection with a serving BS1 (e.g., PBS 106) during network entry. The MS may initiate network entry by sending ranging and basic capability exchange messages with the BS1. After authenticated, the MS may register with the BS1. At step S403, the BS1 may receive application data from another network infrastructure component upstream of the BS in the network such as a BSC, serving gateway, MSC, AP (more generally referred to and shown in FIGS. 4-6 as the "upstream network"). At step S404, the BS1 may transmit the data application to the MS. The BS1 may identify if the MS has the capabilities to support multiple component carriers configured to transmit data packets on different bandwidths and different frequencies. If so, the BS1 may discover or identify the existence of neighboring BSs including a BS2 (e.g., RBS 108), notify the MS of the discovered the BS2 at step S406, and enable the MS to periodically listen to a channel of, and monitor signal strength of, the BS2 at step S408. At step 410, the MS may report to the BS1, the existence of the monitored BS2 when the signal strength of the BS2 exceeds a certain threshold. The BS1 may then decide whether to start a cooperative transmission in between the BS1, the BS2 and the MS.

After the decision of cooperative transmission is made, the BS1 may receive application data from the upstream network at step S411, where at the BS, the application data may await scheduling. The BS1 may categorize the received application data into at least two categories according to QoS priorities at step S412. For example, application data may be categorized into real-time application data or non-real-time application data, where real-time application data may be associated with a higher QoS priority compared to non-real-time application data. Once the packets are assigned respective priorities, the categorized and prioritized application data may be scheduled into a buffer by a scheduler based on the priority of respective packets. For example, packets with higher priority may be put in front of the packets with lower priority in the buffer such that the BS1 transmits the higher-priority packets to the MS before the lower-priority packets.

In the exemplary embodiment of FIG. 4, the BS1 may coordinate the allocation of resources in the network. For example, after the operation of step S412, the BS1 may send a resource allocation request message at step S414 to neighboring BSs, including the BS2, whose signals have been detected by the MS and signal strength exceeds the threshold. In the resource allocation request message, the BS1 may request that the BS2 allocate resources, such as bandwidth and frequency. Upon receipt of the resource allocation request message, the BS2 may send a resource allocation response message to the BS1 indicating whether resources of the BS2 can be allocated. In instances in which the resource allocation is granted at step S416, the BS1 may acquire and analyze access characteristics of the BS2. In one exemplary embodiment the access characteristics of the BS2 may indicate that it is a RBS. In this exemplary embodiment, based on the indication that BS2 is a RBS, the BS1 may identify that the BS2 is an appropriate intermediate BS to transmit the non-real-time application data, and may transmit the non-real-time application data to the BS2 over the appropriate CC (e.g., CC4) at step S418.

When the non-real-time application data is transmitted to the BS2, the BS1 may send a cooperative transmission request message to the MS and initialize the cooperative transmission between the BSs and the MS at step S420. In response to the cooperative transmission request message, the MS may establish a connection with the BS2 at step S422.

The BS1 itself maybe a macro BS, a micro BS or a PBS. In this exemplary embodiment, the BS1 may be a PBS. As described above, the PBS may have multiple component carriers that are suitable to simultaneously transmit control data packets over CC2 and transmit real-time application data over CC1. In this way, the MS may simultaneously receive control packets and real-time application data from the BS1 at step S424, and receive non-real-time application data from the BS2 at step S426, over respective component carriers.

Figure 5:
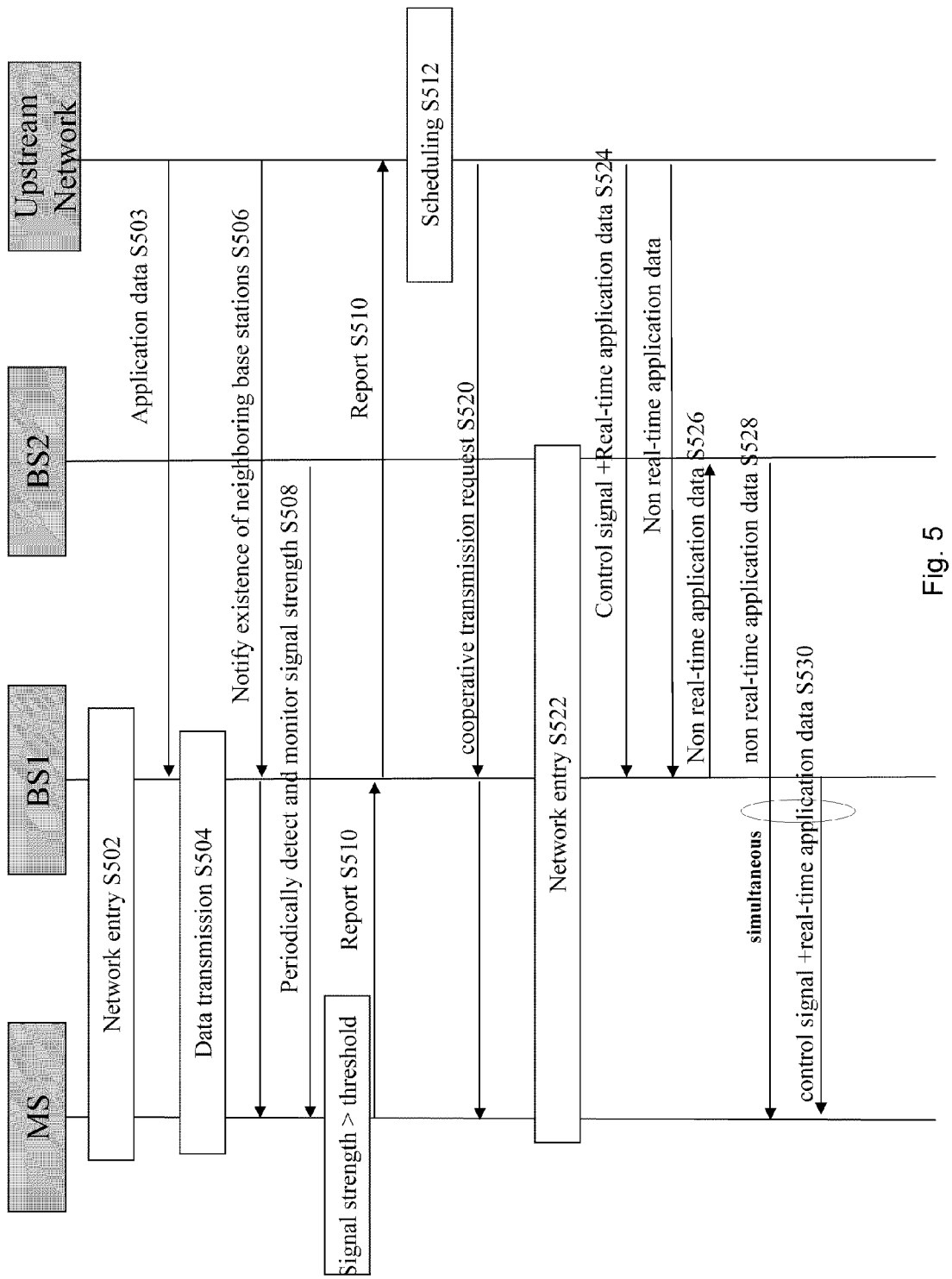

FIG. 5 illustrates a cooperative transmission procedure according to another exemplary embodiment of the subject disclosure. Similar to the procedure described in FIG. 4, the MS may establish a connection with the BS1 during network entry at step S502. After the connection is established, the BS1 may receive application data from the network at step S503. Transmission of the application data may then be executed between the BS1 and the MS at step S504. In this exemplary embodiment, the upstream network (network infrastructure component upstream of the BS, e.g., BSC, MSC, AP) may coordinate the allocation of resources in the network. The upstream network may identify if the MS has the capabilities to support multiple component carriers configured to transmit application data on different bandwidths and different frequencies. If so, the upstream network may discover the existence of neighboring BSs, including the BS2. The upstream network may notify the MS the existence of the BS2 through the BS1 at step S506, and enable the MS to periodically listen to a channel, and monitor signal strength of, the BS2 at step S508. At step S10, the MS may report to the BS1 the existence of the monitored BS2 when signal strength of the BS2 exceeds a certain threshold and then the BS1 may forward this report to the upstream network. The upstream network may then decide whether to start a cooperative transmission in between the BS1, the BS2 and the MS.

After the decision of cooperative transmission is made, similar to the functions taken by the BS1 in FIG. 4, the upstream network may categorize the application data into at least two categories according to QoS priorities at step S512, assign data packets respective priorities and put the data packets in the buffer according to the assigned priorities.

When the application data is scheduled according to the QoS priorities, the upstream network may send a cooperative transmission request message to the MS and initialize the cooperative transmission between the BSs and the MS at step S520. In response to the cooperative transmission request message, the MS may establish a connection with the BS2 at step S522.

In this situation, the MS is connected to both the BS1 and the BS2. To decide data transmission flow to the MS, the upstream network may acquire and analyze access characteristics of the BS1 and the BS2. In this exemplary embodiment, the access characteristics may indicate that the BS1 is a PBS and the BS2 is a RBS. The upstream network may recognize that the BS1 is suitable to transmit real-time application data, and that the BS2 is suitable to transmit the non-real-time application data, based on the access characteristics of the respective BSs. Then the upstream network may transmit to the BS1 at step S524 the control data packets over CC1 and real-time application data over CC2. Since the RBS relays data packets between BS to support multi-hop communications, a unidirectional tunnel may be established to receive the non-real-time application data from the source BS1 at step S526, and then relay the non-real-time application data to the MS at step S528. Accordingly, the MS may simultaneously receive application data from the BS1 at step S530 and from the BS2 at step S528 over respective component carriers.

Figure 6:
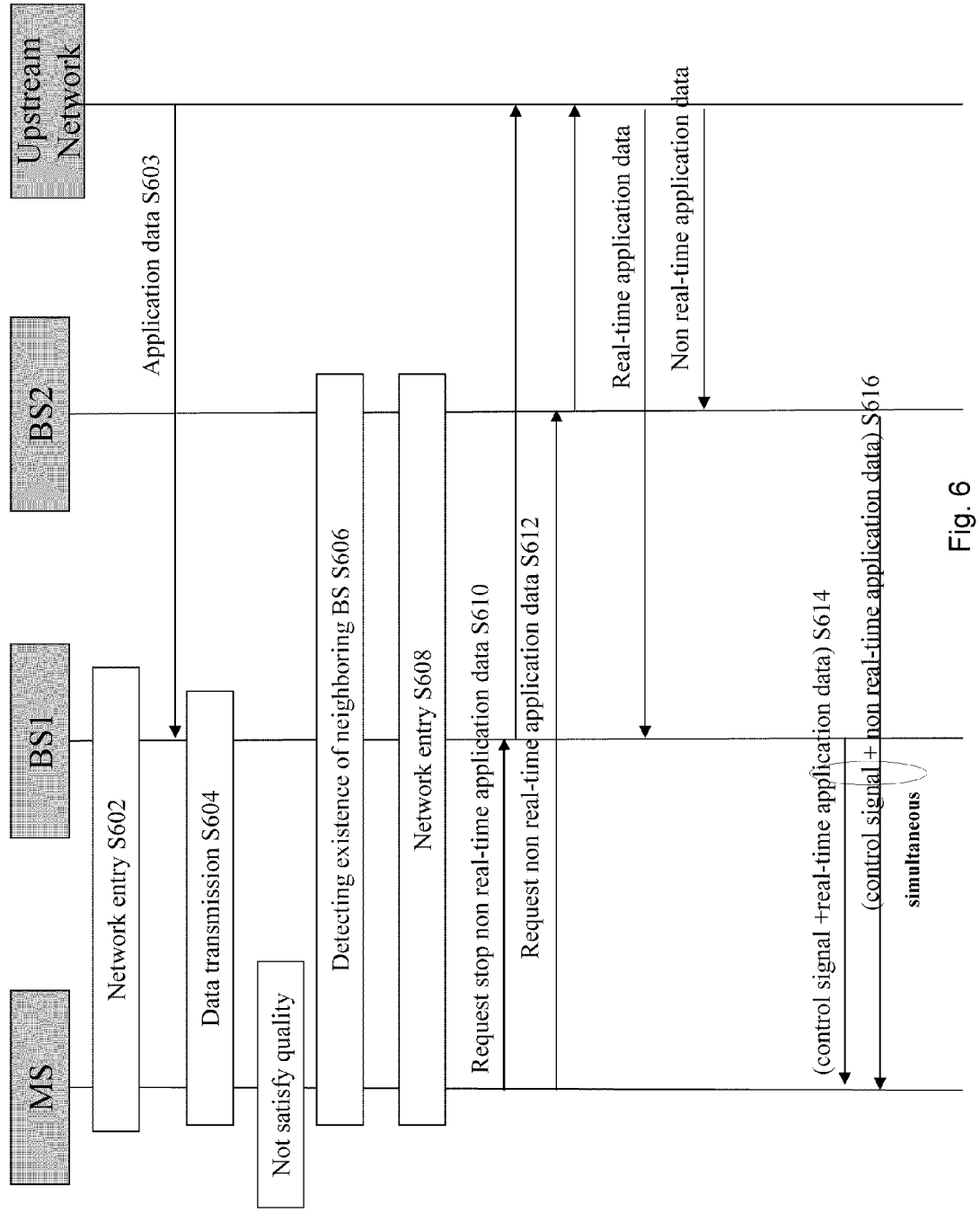

FIG. 6 illustrates a cooperative transmission procedure according to another exemplary embodiment of the subject disclosure. Similar to the procedure described in FIGS. 4 and 5, the MS may establish a connection with the BS1 during network entry at step S602. After the connection is established, the BS1 may receive application data from the upstream network at step S603. Then, transmission of application data between the BS1 and the MS may be executed at step S604. In this exemplary embodiment, the MS may not be satisfied with the connection quality provided by the BS1. In instances in which the BS1 is a PBS and the BS2 is a RBS, for example, the MS may not be satisfied with non-real-time application data transmitted from the BS1. In response to being unsatisfied with the BS1 connection quality, the MS may evaluate itself about the capabilities to support multiple component carriers transmission. The MS may then detect the existence and monitor signal strength of neighboring BSs (including the BS2), such as using another radio frequency, at step S606 if the MS can support multiple component carriers transmission. When signal strength of the BS2 exceeds a certain threshold, the MS may acquire access characteristics of the BS2, and identify that the BS2 is suitable to provide non-real-time application data based on its access characteristics. The MS may then establish a connection with the BS2 at step S608. Upon establishment of the connection with the BS2, the MS may request disconnection of the unsatisfied applications such as non-real time application with the BS1 at step S610, and request transmission of non-real-time application data from the BS2 at step S612. In this manner, the MS may simultaneously receive from the upstream network real-time application data via the BS1 at step S614 and non-real-time application data via the BS2 at step S616. Different from previous embodiments illustrated in FIG. 4 and FIG. 5, the control signals associated with the MS may be transmitted by each BS independent of other BSs.

According to one aspect of the subject disclosure, all or a portion of the MS and/or one or more network infrastructure components (e.g., BSC, MSC, AP) of exemplary embodiments of the subject disclosure, generally operate under control of a computer program. The computer program for performing the methods of exemplary embodiments of the disclosure may include one or more computer-readable program code portions, such as a series of computer instructions, embodied or otherwise stored in a computer-readable storage medium, such as the non-volatile storage medium.

FIGS. 4-6 are control flow diagrams reflecting methods, systems and computer programs according to exemplary embodiments of the disclosure. It will be understood that each block or step of the control flow diagrams, and combinations of blocks or steps in the control flow diagrams, may be implemented by various means, such as hardware alone or in combination with firmware, and/or software including one or more computer program instructions. As will be appreciated, any such computer program instructions may be loaded onto a computer or other programmable apparatus to produce a machine, such that the instructions which execute on the computer or other programmable apparatus (e.g., hardware) create means for implementing the functions specified in the block(s) or step(s) of the control flow diagrams. These computer program instructions may also be stored in a computer-readable memory that may direct a computer or other programmable apparatus to function in a particular manner, such that the instructions stored in the computer-readable memory produce an article of manufacture including instruction means which implement the function specified in the block(s) or step(s) of the control flow diagrams. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that one or more blocks or steps of the control flow diagrams, and combinations of blocks or steps in the control flow diagrams, may be implemented by special purpose hardware-based computer systems which perform the specified functions or steps, or combinations of special purpose hardware and computer instructions.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the disclosure as defined by the appended claims. Although specific terms are employed herein, they are used in a generic and descriptive sense only and not for purposes of limitation.

What is claimed is:

1. A method for transmitting data in a wireless network, the method comprising:
    transmitting at least one capability exchange message to a first base station;
    receiving, from the first base station, a notification of at least one second base station, the at least one second base station identified at least in part based on the capability exchange message;
    initiating, based on the notification, a periodic listening operation to listen on at least one channel associated with the at least one second base station;
    categorizing the data into at least two categories, each category associated with a respective priority;
    directing the categorized data from one of the first base station and the second base station to the other one of the first base station and the second base station, or from a network controller to at least one of the first base station and the second base station, according to the respective priorities and respective access characteristics of each base station;
    transmitting, via a plurality of component carriers, the categorized data comprising real-time application data and non real-time application data from the first base station and the second base station to a mobile station simultaneously, wherein the first base station transmits the real-time application data and the second base station transmits the non real-time application data over a first component carrier and a second component carrier corresponding to the first base station and the second base station, and wherein the first base station and the second base station are configured to transmit one or more control signals associated with the mobile station independent of each of the respective base stations; and
    when a signal strength of the second base station exceeds a certain threshold, determining a decision whether to start transmission between the first base station, the second base station and the mobile station.

2. The method of claim 1, further comprising predefining the respective priority according to transmission and/or reception performance requirements.

3. The method of claim 2, wherein the transmission and/or reception performance requirements comprise at least one of delay, latency, data rate, robust, traffic scenarios, and/or jitter.

4. The method of claim 1, wherein the respective access characteristics of each base station comprises at least one of coverage sizes, transmission power, bandwidth, backhaul connection, access membership restriction, and/or loading.

5. The method of claim 1, wherein the base station comprises at least one of a macro base station, a pico base station, a relay base station, and a femto base station.

6. The method of claim 1, wherein directing the categorized data to a first base station and a second base station is initiated by one of a network controller, a mobile station, or a base station.

7. The method of claim 1, further comprising discovering an existence of neighboring base stations, enabling the mobile station to listen to a channel of the discovered neighboring base stations and monitor signal strength thereof.

8. The method of claim 7, further comprising notifying the mobile station via or independent of the first base station the existence of the second base station, enabling the mobile station to listen to a channel of the discovered neighboring base stations and monitor signal strength thereof.

9. The method of claim 7, further comprising enabling the mobile station to report to the first base station when signal strength of the neighboring base stations exceeds a certain threshold allowing the second base station for transmitting the categorized data.

10. The method of claim 1, further comprising acquiring the access characteristics of the discovered neighboring base station, identifying the data that are suitable to be transmitted by the discovered neighboring base station, enabling the mobile station to receive the categorized data from at least one of the first base station and the second base station over multiple band simultaneously.

11. An apparatus for transmitting data according to traffic priorities in a wireless communication system, the apparatus comprising a processor configured to perform or cause the apparatus to perform the following:
    transmitting at least one capability exchange message to a first base station;
    receiving, from the first base station, a notification of at least one second base station, the at least one second base station identified at least in part based on the capability exchange message;
    initiating, based on the notification, a periodic listening operation to listen on at least one channel associated with the at least one second base station;
    categorizing the data into at least two categories, each category associated with a respective priority;
    directing the categorized data from one of the first base station and the second base station to the other one of the first base station and the second base station, or from a network controller to at least one of the first base station and the second base station, according to the respective priorities and respective access characteristics of each base station;
    transmitting, via a plurality of component carriers, the categorized data comprising real-time application data and non real-time application data from the first base station and the second base station to a mobile station simultaneously, wherein the first base station transmits the real-time application data and the second base station transmits the non real-time application data over a first component carrier and a second component carrier corresponding to the first base station and the second base station, and wherein the first base station and the second base station are configured to transmit one or more control signals associated with the mobile station independent of each of the respective base stations; and
    when a signal strength of the second base station exceeds a certain threshold, determining a decision whether to start transmission between the first base station, the second base station and the mobile station.

12. The apparatus of claim 11, wherein the respective priority comprises respective transmission and/or reception performance requirements.

13. The apparatus of claim 12, wherein the transmission and/or reception performance requirements comprise at least one of delay, latency, data rate, robust, traffic scenarios, and/or jitter.

14. The apparatus of claim 11, wherein the respective access characteristics of each base station comprises at least one of coverage sizes, transmission power, bandwidth, backhaul connection, access membership restriction, and/or loading.

15. The apparatus of claim 11, wherein the base station comprises at least one of a macro base station, a pico base station, a relay base station, and a femto base station.

16. The apparatus of claim 11, wherein directing the categorized data to the first base station and the second base station is initiated by one of a network controller, a mobile station, or a base station.

17. The apparatus of claim 11, further configured to discover an existence of neighboring base stations, enable the mobile station to listen to a channel of the discovered neighboring base stations and monitor signal strength thereof.

18. The apparatus of claim 11, further configured to acquire the access characteristics of the discovered neighboring base station, identify the data that are suitable to be transmitted by the discovered neighboring base station, enable the mobile station to receive the categorized data from at least one of the first base station and the second base station over multiple band simultaneously.

19. A method for transmitting data in a wireless network, the method comprising:

discovering an existence of a neighboring base station;

analyzing access characteristics of the discovered neighboring base station;

establishing a connection with the discovered neighboring base station;

receiving at least one capability exchange message from a mobile station;

selecting the neighboring base station based at least in part on the capability exchange message and the access characteristics of the neighboring base station;

enabling the mobile station to initiate a listening operation on a channel associated with the neighboring base station in response to selecting the neighboring base station;

categorizing the data into at least two categories, each category being associated with a respective priority;

directing the categorized data comprising real-time application data and non real-time application data from one of a first base station and the neighboring base station comprising a second base station to the other one of the first base station and the neighboring base station comprising the second base station, or from a network controller to at least one of the first base station and the second base station according to the respective priorities;

identifying the categorized data that are suitable to be transmitted by the discovered neighboring base station;

directing, via a plurality of component carriers, transmission of the identified categorized data from the first base station and the neighboring base station to the mobile station simultaneously according to the access characteristics, wherein the first base station transmits the real-time application data and the neighboring base station transmits the non real-time application data over a first component carrier and a second component carrier corresponding to the first base station and the neighboring base station, and wherein the first base station and the second base station are configured to transmit one or more control signals associated with the mobile station independent of each of the respective base stations; and when a signal strength of the second base station exceeds a certain threshold, determining a decision whether to start transmission between the first base station, the second base station and the mobile station.

20. The method of claim 19, further comprising predefining the respective priority according to transmission and/or reception performance requirements.

21. The method of claim 20, wherein the transmission and/or reception performance requirements comprise at least one of delay, latency, data rate, robust, traffic scenarios, and/or jitter.

22. The method of claim 19, further comprising acquiring the access characteristics of the discovered neighboring base station, identifying the data that are suitable to be transmitted by the discovered neighboring base station, enabling the mobile station to receive the scheduled, categorized data from at least one of a first base station and a second base station over multiple band simultaneously.

* * * * *

UNITED STATES PATENT AND TRADEMARK OFFICE
CERTIFICATE OF CORRECTION

PATENT NO. : 9,681,464 B2  
APPLICATION NO. : 12/877891  
DATED : June 13, 2017  
INVENTOR(S) : Chou Page 1 of 1

It is certified that error appears in the above-identified patent and that said Letters Patent is hereby corrected as shown below:

On the Title Page

Insert the following:
-- Related U.S. Application Data
(60) Provisional application No. 61/243,812, filed on Sep. 18, 2009. --.

Signed and Sealed this
Twentieth Day of March, 2018

Andrei Iancu
*Director of the United States Patent and Trademark Office*